(12) United States Patent
Matsunaga et al.

(10) Patent No.: US 9,306,477 B2
(45) Date of Patent: Apr. 5, 2016

(54) CONTROL DEVICE FOR HYBRID VEHICLE

(71) Applicant: MITSUBISHI JIDOSHA KOGYO KABUSHIKI KAISHA, Tokyo (JP)

(72) Inventors: Hideo Matsunaga, Okazaki (JP); Hisakazu Ikedaya, Okazaki (JP); Hitoshi Kamura, Okazaki (JP); Toshiyuki Miyata, Oazaki (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/200,578

(22) Filed: Mar. 7, 2014

(65) Prior Publication Data
US 2014/0250990 A1 Sep. 11, 2014

(30) Foreign Application Priority Data

Mar. 8, 2013 (JP) ................. 2013-046526

(51) Int. Cl.
*H02P 1/00* (2006.01)
*B60K 6/442* (2007.10)
*B60W 10/06* (2006.01)
*B60W 10/08* (2006.01)
*B60W 20/00* (2006.01)

(52) U.S. Cl.
CPC . *H02P 1/00* (2013.01); *B60K 6/442* (2013.01); *B60W 10/06* (2013.01); *B60W 10/08* (2013.01); *B60W 20/50* (2013.01); *B60W 2710/0605* (2013.01); *B60Y 2300/47* (2013.01); *B60Y 2300/64* (2013.01); *Y02T 10/6234* (2013.01); *Y02T 10/6286* (2013.01); *Y02T 10/641* (2013.01); *Y02T 10/7077* (2013.01)

(58) Field of Classification Search
None
See application file for complete search history.

(56) References Cited

U.S. PATENT DOCUMENTS

| | | | | | |
|---|---|---|---|---|---|
| 5,359,228 | A | * | 10/1994 | Yoshida | 290/17 |
| 6,543,220 | B2 | * | 4/2003 | Yoshida | F02D 41/042 60/274 |
| 7,047,728 | B2 | * | 5/2006 | Yasui | F02D 41/1494 60/274 |
| 7,316,157 | B2 | * | 1/2008 | Ohsaki | F01N 11/002 73/114.69 |
| 7,418,957 | B2 | * | 9/2008 | Abe | F02D 41/1494 123/697 |
| 7,475,234 | B2 | * | 1/2009 | Suzuki | F02D 41/22 713/1 |
| 2006/0277907 | A1 | * | 12/2006 | Ueda | F02B 37/16 60/601 |
| 2007/0175454 | A1 | * | 8/2007 | Shimazaki | F02D 41/062 123/497 |
| 2007/0204840 | A1 | * | 9/2007 | Abe | F02D 41/1494 123/697 |

FOREIGN PATENT DOCUMENTS

| | | |
|---|---|---|
| JP | 2011-21567 A | 2/2011 |
| JP | 2011-194976 A | 10/2011 |

* cited by examiner

*Primary Examiner* — John Walters
*Assistant Examiner* — Hilary L Johns
(74) *Attorney, Agent, or Firm* — Birch, Stewart, Kolasch & Birch, LLP

(57) ABSTRACT

In a hybrid vehicle that selects a series mode in which an engine drives a motor generator to generate electric power and a driving motor drives drive wheels, fuel supply to the engine is stopped and motoring in which the motor generator forcedly drives the engine can be performed, failure determination of a front O2 sensor and a rear O2 sensor provided in an exhaust passage of the engine can be performed based on a change in a detection value of the sensors when the fuel supply is stopped, and a throttle valve of the engine is forcedly opened in the motoring.

6 Claims, 3 Drawing Sheets

CONTROL DEVICE FOR HYBRID VEHICLE

BACKGROUND OF THE INVENTION

1. Field of the Invention

The present invention relates to a technique of reducing electric power consumption in failure determination of a detection unit provided in an exhaust system of an engine of a hybrid vehicle.

2. Description of the Related Art

Among recently developed hybrid vehicles, a vehicle has been developed that allows a travel mode (series mode) in which an engine drives a motor generator to generate electric power and only an electric motor drives travel driving wheels.

Further, for the hybrid vehicle that allows the travel mode, a technique has been developed of performing failure determination of a detection unit (air-fuel ratio sensor, oxygen concentration sensor, catalyst monitor, or the like) in an exhaust system of an engine in the travel mode.

For example, Japanese Patent Laid-Open No. 2011-194976 discloses a technique of stopping fuel supply to an engine and performing so-called motoring in which a motor generator is driven using electric power supplied from a driving battery included in a vehicle to forcedly drive the engine, and while ensuring an exhaust flow rate of the engine, performing failure determination of a detection unit in each exhaust system from a change in a detection value of the detection unit due to the stop of the fuel supply.

However, in the failure determination as described above, to ensure determination accuracy, a high rotation speed has to be set in motoring so as to obtain a required exhaust flow rate.

Thus, electric power consumption due to the motoring performed in the failure determination may reduce a state of charge of the driving battery. Thus, to recover the state of charge of the driving battery after the failure determination, the engine has to be driven so as to increase an amount of electric power generation of the motor generator, which may reduce fuel efficiency.

SUMMARY OF THE INVENTION

The present invention is achieved to solve the problem described above, and has an object to provide a control device for a hybrid vehicle that can reduce electric power consumption due to motoring performed in failure determination while ensuring accuracy of the failure determination.

To achieve the object, the present invention provides a control device for a hybrid vehicle, comprising: an engine included in the vehicle; a detection unit that detects an exhaust constituent of the engine; a motor generator that is driven by the engine to generate electric power, while driving the engine using electric power supplied from a driving battery included in the vehicle; a driving motor that drives drive wheels using the electric power supplied from the driving battery; a motoring performing unit that stops fuel supply to the engine and forcedly drives the engine using the motor generator to perform motoring; a failure determination unit that performs failure determination of the detection unit based on a detection value of the detection unit at stop of the fuel supply; and a throttle valve control unit that forcedly opens a throttle valve that controls an intake flow rate of the engine during performance of the motoring.

Thus, when the motoring is performed in the failure determination of the detection unit by the failure determination unit, the throttle valve is forcedly opened, thereby reducing intake resistance. This can reduce a rotation speed of the motor generator in the motoring while ensuring an exhaust flow rate required for the failure determination, and reduce electric power consumption by the motor generator in the failure determination of the detection unit.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Now, an embodiment of the present invention will be described with reference to the drawings.

Figure 1:
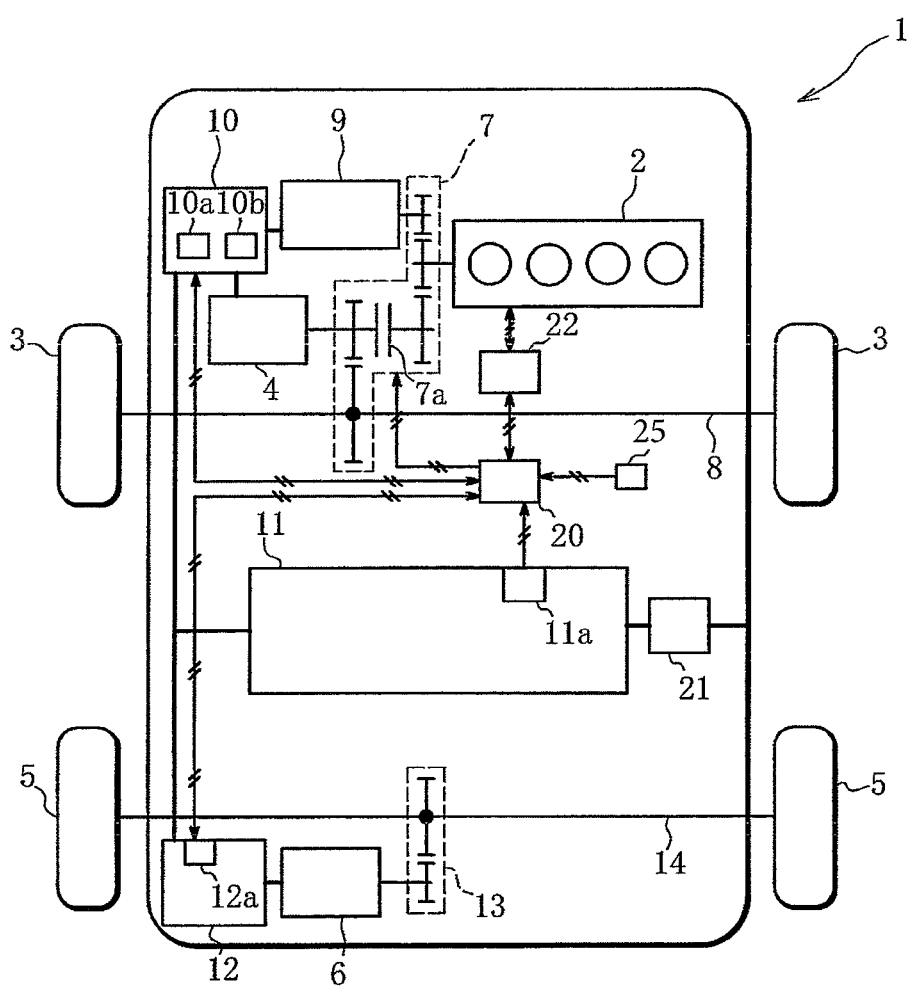
FIG. 1 is a schematic configuration diagram of a plug-in hybrid vehicle according to an embodiment of the present invention.

FIG. 1 is a schematic configuration diagram of a plug-in hybrid vehicle (hereinafter referred to as vehicle 1) according to an embodiment of the present invention.

The vehicle 1 of this embodiment is a four-wheel-drive vehicle that can travel by driving front wheels 3 using an output of an engine 2, and includes an electric front motor 4 (driving motor) that drives the front wheels 3, and an electric rear motor 6 (driving motor) that drives rear wheels 5.

The engine 2 can drive a drive axle 8 of the front wheels 3 via a reducer 7, and drive a motor generator 9 via the reducer 7 to generate electric power.

The front motor 4 is driven by electric power of a high voltage supplied from a driving battery 11 and the motor generator 9 included in the vehicle 1 via a front inverter 10 to drive the drive axle 8 of the front wheels 3 via the reducer 7. The reducer 7 includes a clutch 7a that can connect/disconnect transmission of power between an output shaft of the engine 2 and the drive axle 8 of the front wheels 3.

The rear motor 6 is driven by electric power of a high voltage supplied from the driving battery 11 and the motor generator 9 via a rear inverter 12 to drive a drive axle 14 of the rear wheels 5 via a reducer 13.

The electric power generated by the motor generator 9 can charge the driving battery 11 via the front inverter 10, and can be supplied to the front motor 4 and the rear motor 6.

The driving battery 11 includes a secondary battery such as a lithium-ion battery, has a battery module (not shown) including a plurality of battery cells together, and further includes a battery monitoring unit 11a that monitors a state of charge (SOC) and the like of the battery module.

The front inverter 10 includes a front motor control unit 10a and a generator control unit 10b. The front motor control unit 10a controls an output of the front motor 4 based on a control signal from a hybrid control unit 20 (mode switching unit). The generator control unit 10b has a function of controlling an amount of electric power generation of the motor generator 9 based on a control signal from the hybrid control unit 20.

The rear inverter 12 includes a rear motor control unit 12a. The rear motor control unit 12a has a function of controlling an output of the rear motor 6 based on a control signal from the hybrid control unit 20.

Further, the motor generator 9 can drive the engine 2 using electric power supplied from the driving battery 11 based on a control signal from the hybrid control unit 20, and has a function of a starter motor of the engine 2.

Also, the vehicle 1 includes a charger 21 that charges the driving battery 11 using an external power supply.

The hybrid control unit 20 is a control device for generally controlling the vehicle 1, and includes an input/output device, a storage device (ROM, RAM, nonvolatile RAM, or the like), a central processing unit (CPU), or the like.

To an input side of the hybrid control unit 20, the battery monitoring unit 11a of the driving battery 11, the front motor control unit 10a and the generator control unit 10b of the front inverter 10, the rear motor control unit 12a of the rear inverter 12, an engine control unit 22 (failure determination unit, throttle valve control unit), and an accelerator opening sensor 25 that detects an amount of accelerator operation are connected, and detection and actuation information from these instruments are input.

On the other hand, to an output side of the hybrid control unit 20, the front motor control unit 10a and the generator control unit 10b of the front inverter 10, the rear motor control unit 12a of the rear inverter 12, the reducer 7 (clutch 7a), and the engine control unit 22 are connected.

The hybrid control unit 20 calculates a vehicle request output required for travel driving of the vehicle 1 based on various detection amounts and various kinds of actuation information described above from the accelerator opening sensor 25 or the like, sends a control signal to the engine control unit 22, the front motor control unit 10a, the generator control unit 10b, the rear motor control unit 12a, and the reducer 7, to control switching among travel modes (electric vehicle (EV) mode, series mode, and parallel mode), outputs of the engine 2, the front motor 4, and the rear motor 6, and an output (generated electric power) of the motor generator 9. The hybrid control unit 20 includes a motoring performing unit that forcedly operates the engine using the motor generator.

In the EV mode (second travel mode), the engine 2 is stopped, and the front motor 4 and the rear motor 6 are driven by electric power supplied from the driving battery 11 to cause the vehicle to travel. In the series mode (first travel mode), the clutch 7a in the reducer 7 is disconnected, and the engine 2 actuates the motor generator 9. The front motor 4 and the rear motor 6 are driven by electric power generated by the motor generator 9 and electric power supplied from the driving battery 11 to cause the vehicle to travel. In the series mode, the rotational speed of the engine 2 is set to a predetermined rotational speed, and the electric power generated by the motor generator 9 is supplied to the driving battery 11 to charge the driving battery 11.

In the parallel mode, the clutch 7a in the reducer 7 is connected, and power is mechanically transmitted from the engine 2 via the reducer 7 to drive the front wheels 3. The front motor 4 and the rear motor 6 are driven by the electric power generated by the motor generator 9 actuated by the engine 2 and the electric power supplied from the driving battery 11 to cause the vehicle to travel.

The hybrid control unit 20 switches the travel mode to the parallel mode in a region with high efficiency of the engine 2, such as a high speed region. In regions other than the parallel mode, that is, middle and low speed regions, the travel mode is switched between the EV mode and the series mode based on the state of charge SOC of the driving battery 11.

Further, the hybrid control unit 20 has a function of forcedly driving the engine 2 to generate electric power and charge the driving battery 11 when the state of charge SOC of the driving battery 11 is lower than an allowable range.

Figure 2:
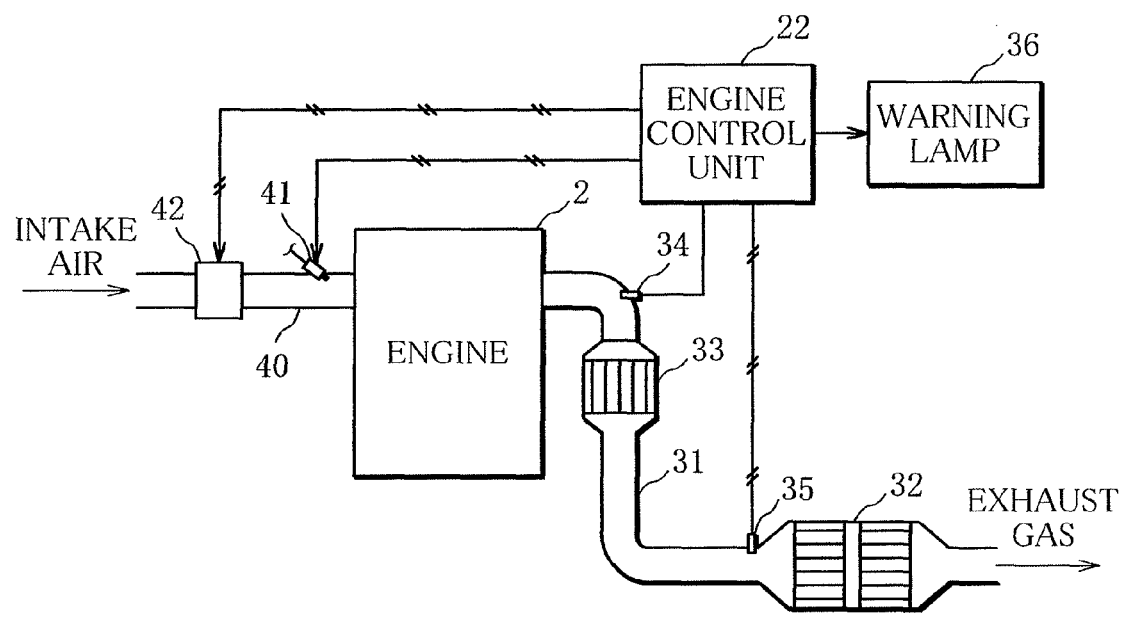
FIG. 2 is a schematic configuration diagram of an exhaust system of an engine according to this embodiment.

FIG. 2 is a schematic configuration diagram of an intake/exhaust system of the engine.

As shown in FIG. 2, an exhaust passage 31 of the engine 2 in this embodiment includes a main exhaust gas purifying catalyst 32 and a warm-up exhaust gas purifying catalyst 33.

The main exhaust gas purifying catalyst 32 and the warm-up exhaust gas purifying catalyst 33 are catalysts for purifying an exhaust gas from the engine 2 such as a known three-way catalyst.

The main exhaust gas purifying catalyst 32 is a catalyst having a large capacity so as to mainly purify the exhaust gas, and for example, placed below a floor of the vehicle 1. The warm-up exhaust gas purifying catalyst 33 is a catalyst having a small capacity, and placed on an upstream side of the main exhaust gas purifying catalyst 32 and near the engine 2. The warm-up exhaust gas purifying catalyst 33 is quickly increased in temperature by the exhaust gas emitted from the engine 2 when a temperature of the main exhaust gas purifying catalyst 32 is low at cold start of the engine 2, or the like, thereby ensuring exhaust gas purifying performance.

In the exhaust passage 31 between the engine 2 and the warm-up exhaust gas purifying catalyst 33, a front O2 sensor 34 (detection unit) that detects an oxygen concentration of the exhaust gas is provided. In the exhaust passage 31 between the warm-up exhaust gas purifying catalyst 33 and the main exhaust gas purifying catalyst 32, a rear O2 sensor 35 (detection unit) that detects an oxygen concentration of the exhaust gas is provided. The front O2 sensor 34 and the rear O2 sensor 35 may be air-fuel ratio sensors.

The front O2 sensor 34 and the rear O2 sensor 35 output the respective detected oxygen concentrations as voltage values to the engine control unit 22.

Also, in an intake passage 40 of the engine, a fuel injection valve 41 that injects and supplies fuel is provided, and a throttle valve 42 that controls an intake flow rate is provided on an upstream side of the fuel injection valve 41. The fuel injection valve 41 and the throttle valve 42 are controlled by the engine control unit 22.

The engine control unit 22 includes an input/output device, a storage device (ROM, RAM, nonvolatile RAM, or the like), a central processing unit (CPU), or the like. The engine control unit 22 controls the fuel injection valve 41 and the throttle valve 42 based on a request output signal of the engine 2 input from the hybrid control unit 20, to control an output of the engine 2. The engine control unit 22 also controls an air-fuel ratio based on detection values input from the front O2 sensor 34 and the rear O2 sensor 35.

Further, in this embodiment, the engine control unit 22 has a function of failure determination of the front O2 sensor 34 and the rear O2 sensor 35. When it is determined by the function of failure determination that either the front O2 sensor 34 or the rear O2 sensor 35 is in failure, a driver is informed of the determination by a warning lamp 36 provided on a driver's seat in the vehicle 1.

The failure determination of the front O2 sensor 34 and the rear O2 sensor 35 is performed when a rotation speed of a drive shaft of the engine 2 is a predetermined value or more and the fuel supply to the engine 2 is stopped, based on the detection values of the O2 sensors 34, caused by the stop of the fuel supply. In the parallel mode, the failure determination is performed at stop of fuel injection in deceleration of the vehicle. Further, in this embodiment, failure determination of the O2 sensors 34, can be performed also in the series mode.

The failure determination of the O2 sensors 34, 35 in the series mode is performed when motoring in which the motor generator 9 forcedly drives the engine 2 is performed and the fuel supply to the engine 2 is stopped. The failure determination can be performed in two kinds of motoring including motoring before engine stop performed in shift from the series mode to the EV mode in which driving of the engine 2 is stopped, and motoring during series performed in the series mode. The failure determination performed in the motoring before engine stop is failure determination before travel mode switching, and the failure determination performed in the motoring during series is failure determination in first travel mode.

Figure 3:
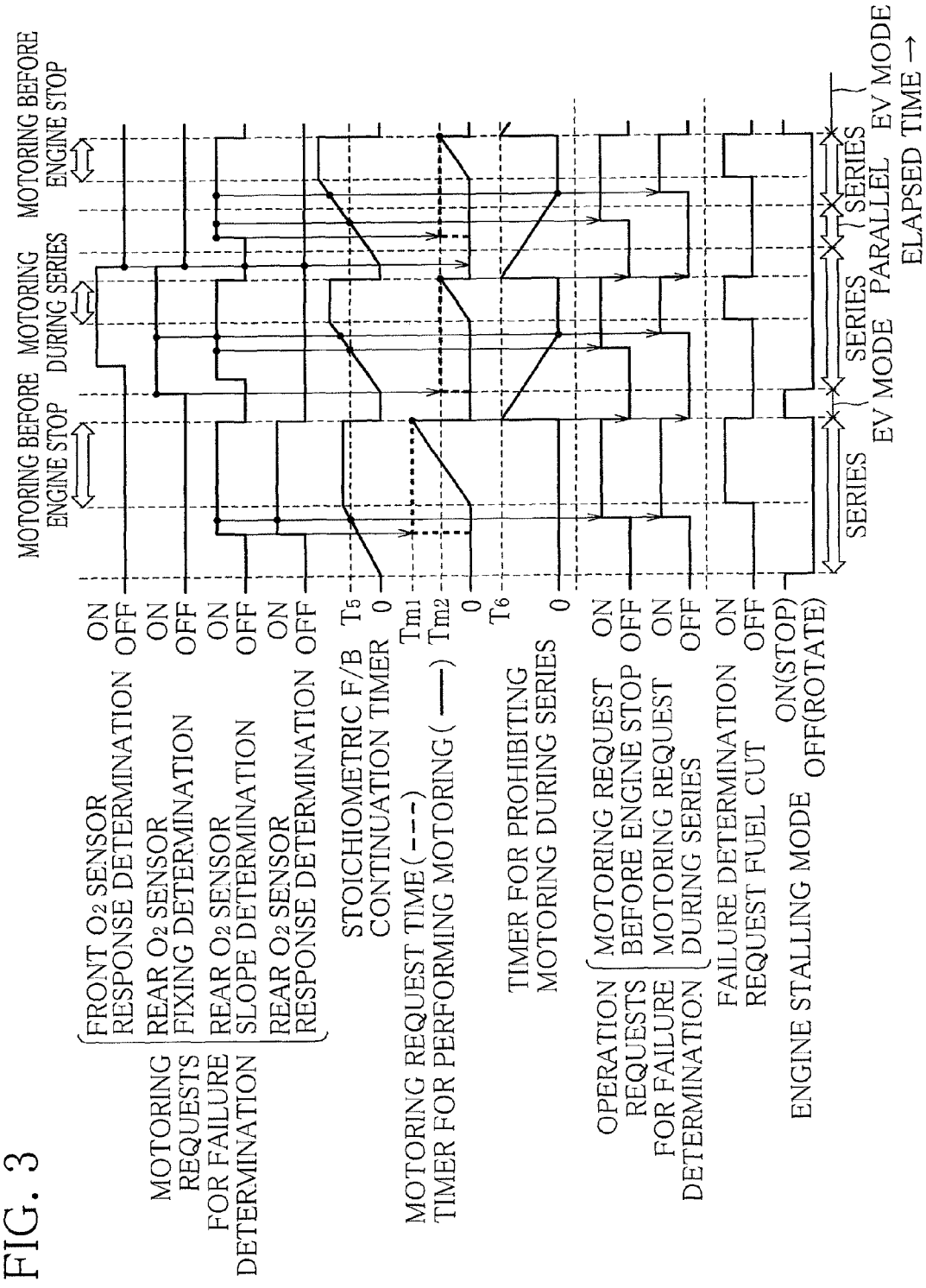
FIG. 3 is a timing chart showing an embodiment of control timings of various control signals in failure determination in each motoring.

FIG. 3 is a timing chart showing an embodiment of control timings of various control signals in failure determination in each motoring.

In this embodiment shown in FIG. 3, request timings are shown of motoring and stop of fuel supply in the case where the travel mode is switched from the series mode to the EV mode, the series mode, the parallel mode, the series mode, and the EV mode in this order.

As shown in FIG. 3, motoring before engine stop is performed before switching from the series mode to the EV mode, in the next series mode, the series mode is suspended and motoring during series is performed, and the motoring before engine stop is again performed before switching from the next series mode to the EV mode.

In this embodiment, one kind of failure determination method is performed for the front O2 sensor 34, and three kinds of failure determination methods are performed for the rear O2 sensor 35 at two timings of the motoring before engine stop and the motoring during series. Specifically, front O2 sensor response determination is performed for the front O2 sensor 34. Rear O2 sensor fixing determination, rear O2 sensor slope determination, and rear O2 sensor response determination are performed for the rear O2 sensor 35.

The motoring requests for failure determination in FIG. 3 show request timings and times of motoring requested by the failure determination methods, and ON in FIG. 3 shows the motoring being requested.

Among the four kinds of failure determination methods described above, in the front O2 sensor response determination, a time for the detection value of the front O2 sensor 34 to change by a predetermined amount of change is measured both when an air-fuel ratio of an exhaust gas changes from rich to lean and when changes from lean to rich, whether the measured time is a threshold T1 or more is determined, and when the time is the threshold T1 or more, it is determined that responsiveness of the front O2 sensor 34 is abnormal.

In the rear O2 sensor fixing determination, a state in which the detection value of the rear O2 sensor 35 is fixed, that is, does not change at all is determined, and in the case where the detection value of the rear O2 sensor 35 does not change when an operation is performed such that the air-fuel ratio of the exhaust gas changes from rich to lean and from lean to rich, it is determined that the rear O2 sensor 35 is fixed and in failure. In the rear O2 sensor slope determination, a rate of change of the detection value of the rear O2 sensor 35 is determined, and this determination is made when the air-fuel ratio of the exhaust gas changes from rich to lean. In this determination, a time for the detection value of the rear O2 sensor 35 to change by a predetermined amount of change in a middle region is measured, whether the measured time is a threshold T3 or more is determined, and when the time is the threshold T3 or more, it is determined that the rate of change of the rear O2 sensor 35 is abnormal.

In the rear O2 sensor response determination, a rate of change of the detection value including initial responsiveness of the rear O2 sensor 35 is determined, and this determination is also made when the air-fuel ratio of the exhaust gas changes from rich to lean. In this determination, a time for the detection value of the rear O2 sensor 35 to change from the stop of fuel supply to a predetermined value is measured, whether the measured time is a threshold T4 or less is determined, and when the time is more than the threshold T4, it is determined that the responsiveness of the rear O2 sensor 35 is abnormal. In this embodiment, the threshold T4 for the rear O2 sensor response determination is set to a longer time than the threshold T3 for the slope determination, and the threshold T1 for the front O2 sensor response determination is set to substantially the same time as the threshold T3 for the slope determination.

A stoichiometric F/B continuation timer is a timer that measures that a stoichiometric operation state continues for a predetermined time T5 in the engine 2 and the air-fuel ratio of the exhaust gas is stable. Measurement by the timer is started from start of the series mode or finish of the motoring during series, and the operation of the motoring is prohibited to restrict the failure determination until the predetermined time T5 has passed, thereby allowing accurate failure determination.

A motoring request time is required according to the motoring request of each failure determination described above. Since the threshold T4 for the rear O2 sensor response determination is longer than the thresholds T1 to T3 for the other determinations as described above, the motoring request time is set to a long time Tm1 when the rear O2 sensor response determination is performed, and the motoring request time is set to a short time Tm2 when the failure determination other than the rear O2 sensor response determination is performed.

A timer for performing motoring is a timer that sets a performing time of the motoring, measurement is started from start of the motoring, and the motoring is finished when the motoring request time (Tm1 or Tm2) has passed.

A timer for prohibiting motoring during series is a timer that starts measurement when the motoring is finished and prohibits the next motoring until the measurement has been performed for a predetermined time T6.

Operation requests for failure determination are motoring operation requests including a combination of the motoring requests described above under the condition of removal of the restrictions by the stoichiometric F/B continuation timer and the timer for prohibiting motoring during series.

Failure determination request fuel cut is ON between motoring request start timing input from the hybrid control unit 20 and the timer for performing motoring reaching the motoring request time (Tm1 or Tm2) to stop the fuel supply.

An engine stalling mode is ON when rotation of the drive shaft of the engine 2 is stopped, and OFF when the drive shaft is rotating.

As described above, in this embodiment, when the failure determination of the front O2 sensor 34 and the rear O2 sensor 35 is performed in the series mode, the failure determination can be performed both in the motoring before engine stop in switching from the series mode to the EV mode, and in the motoring during series.

In the failure determination in the motoring during series (failure determination in first travel mode), fuel injection from the fuel injection valve 41 is stopped while the motoring in which the motor generator 9 forcedly drives the engine 2 is performed, a change from rich to lean of an oxygen concentration (or air-fuel ratio) of the exhaust gas is detected, and failure determination of the front O2 sensor 34 and the rear O2 sensor 35 is performed. Then, when the fuel injection from the fuel injection valve 41 is restarted in recovery from the motoring to the series operation, a change from lean to rich of the oxygen concentration (or air-fuel ratio) of the exhaust gas is detected, and failure determination of the front O2 sensor 34 and the rear O2 sensor 35 is performed. Thus, in the failure determination in the motoring during series, ensuring the motoring time allows all the failure determination methods described above.

Also, in the failure determination in the motoring before engine stop (failure determination before travel mode switching), the slope determination and the response determination of the rear O2 sensor 35 can be performed that are failure determination methods that can be performed in the state where the air-fuel ratio of the exhaust gas changes from rich to lean.

Further, in this embodiment, there is a feature in control of the throttle valve 42 in the motoring performed in the failure determination.

Specifically, in this embodiment, the throttle valve 42 is forcedly opened in the motoring.

In an engine 2 that does not perform motoring, a throttle valve 45 is generally closed with stop of fuel injection. On the other hand, in this embodiment, the throttle valve 45 is forcedly opened in the motoring to reduce intake resistance and increase an intake flow rate of the engine 2. Thus, the rotation speed of the motor generator 9 can be kept low while ensuring an exhaust flow rate required for the failure determination, thereby reducing electric power consumption of the motor generator 9 in the motoring performed in the failure determination.

Further, in this embodiment, the opening of the throttle valve 45 is variably controlled according to the rotation speed of the motor generator 9 or the engine 2 in the failure determination. The rotation speed of the motor generator 9 in the failure determination is set differently depending on failure determination timings. For example, in the motoring during series, the rotation speed of the motor generator 9 is high, and in the motoring before engine stop, the rotation speed of the motor generator 9 is low. Thus, in the motoring during series, the throttle valve 45 is set to a small opening, and in the motoring before engine stop, the throttle valve 45 is set to a large opening. This ensures an exhaust flow rate required for the failure determination both in the motoring during series and in the motoring before engine stop.

In the motoring before engine stop, driving of the engine 2 is stopped after the motoring. Thus, setting a low rotation speed of the motor generator 9 can reduce a change in the rotation speed of the engine 2 before and after the finish of the motoring, and also reduce electric power consumption by the motor generator 9 as described above.

Also, in the motoring during series, the engine 2 is started after the motoring. Thus, setting a high rotation speed of the motor generator 9 allows smooth start of the engine 2, and can reduce a difference between the rotation speed of the engine before and after the motoring and the rotation speed of the engine during the motoring, thereby reducing a change of operation noise or vibration of the engine 2 and increasing comfort of a passenger.

The present invention is not limited to the above described embodiment. For example, in the above described embodiment, the rotation speed of the motor generator 9 in the motoring is switched between two stages in the motoring before engine stop and the motoring during series, and thus the opening of the throttle valve 45 in the motoring is switched between two stages. However, in the vehicle in which the rotation speed of the motor generator 9 in the motoring is set to a constant value, the throttle valve 45 can be opened in the motoring to reduce electric power consumption. Also, in the case where the rotation speed of the motor generator 9 in the motoring is more finely set, the opening of the throttle valve 45 may be variably set according to the rotation speed of the motor generator 9.

Also, the rotation speed of the motor generator 9 in the motoring may be changed according to each failure determination method, and the opening of the throttle valve 45 may be changed along therewith. As such, the rotation speed of the motor generator 9 in the motoring is finely set to reduce the intake flow rate close to a minimum flow rate required for each failure determination, thereby further reducing electric power consumption by the motor generator 9.

Also, a determination method other than the failure determination method in the above described embodiment, for example, catalyst degradation determination using the rear O2 sensor 35 may be performed in the motoring during series. The present invention may be widely applied to a detection unit other than the front O2 sensor 34 and the rear O2 sensor 35, provided in the exhaust system of the engine 2.

Also in this embodiment, the present invention is applied to a plug-in hybrid vehicle that allows switching among the EV mode, the series mode, and the parallel mode, but may be widely applied to a hybrid vehicle that allows a travel mode in which at least an engine drives a motor generator to generate electric power, and only an electric motor drives travel drive wheels.

What is claimed is:

1. A control device for a hybrid vehicle, comprising:
   an engine included in the vehicle;
   a detection unit that detects an exhaust constituent of the engine;
   a motor generator that is driven by the engine to generate electric power, while driving the engine using electric power supplied from a driving battery included in the vehicle;
   a driving motor that drives drive wheels using the electric power supplied from the driving battery;
   a motoring performing unit that stops fuel supply to the engine and forcedly drives the engine using the motor generator to perform motoring;
   a failure determination unit that performs failure determination of the detection unit based on a detection value that is detected by the detection unit while the motoring is performed with the fuel supply stopped; and
   a throttle valve control unit that forcedly opens a throttle valve that controls an intake flow rate of the engine during performance of the motoring, wherein
   the motoring performing unit continues the motoring until the failure determination is completed.

2. The control device for a hybrid vehicle according to claim 1, wherein
   the throttle valve control unit controls an opening of the throttle valve based on a rotation speed of the motor generator or the engine in the motoring.

3. The control device for a hybrid vehicle according to claim 1, further comprising:
   a mode switching unit that switches between a first travel mode in which the engine drives the motor generator to generate electric power and the driving motor drives the drive wheels, and a second travel mode in which the driving of the engine is stopped and the driving motor drives the drive wheels, wherein
   the failure determination unit performs
   failure determination in first travel mode in which the first travel mode is suspended, the motoring performing unit performs the motoring, and failure determination of the detection unit is performed, and failure determination before travel mode switching in which when the mode switching unit stops driving of the engine and switches from the first travel mode to the second travel mode, the motoring performing unit performs the motoring before driving of the engine is stopped, and failure determination of the detection unit is performed.

4. The control device for a hybrid vehicle according to claim 2, further comprising:
   a mode switching unit that switches between a first travel mode in which the engine drives the motor generator to generate electric power and the driving motor drives the drive wheels, and a second travel mode in which the driving of the engine is stopped and the driving motor drives the drive wheels, wherein
   the failure determination unit performs
   failure determination in first travel mode in which the first travel mode is suspended, the motoring performing unit performs the motoring, and failure determination of the detection unit is performed, and
   failure determination before travel mode switching in which when the mode switching unit stops driving of the engine and switches from the first travel mode to the second travel mode, the motoring performing unit performs the motoring before driving of the engine is stopped, and failure determination of the detection unit is performed.

5. The control device for a hybrid vehicle according to claim 3, wherein
   the throttle valve control unit sets an opening of the throttle valve in the failure determination before travel mode switching to an opening larger than an opening of the throttle valve in the failure determination in first travel mode.

6. The control device for a hybrid vehicle according to claim 4, wherein
   the throttle valve control unit sets an opening of the throttle valve in the failure determination before travel mode switching to an opening larger than an opening of the throttle valve in the failure determination in first travel mode.

* * * * *